(12) United States Patent
Sundararajan et al.

(10) Patent No.: US 12,224,985 B2
(45) Date of Patent: Feb. 11, 2025

(54) EDGE DATA CORRECTNESS AND CORRECTNESS SPREAD DETERMINATION

(71) Applicant: International Business Machines Corporation, Armonk, NY (US)

(72) Inventors: Mukundan Sundararajan, Bangalore (IN); Jignesh K Karia, Mumbai (IN); Shilpa Shetty, Marathahalli (IN)

(73) Assignee: International Business Machines Corporation, Armonk, NY (US)

( * ) Notice: Subject to any disclaimer, the term of this patent is extended or adjusted under 35 U.S.C. 154(b) by 386 days.

(21) Appl. No.: 17/174,551

(22) Filed: Feb. 12, 2021

(65) Prior Publication Data

US 2022/0263801 A1    Aug. 18, 2022

(51) Int. Cl.
*H04L 9/40* (2022.01)
*G06N 20/00* (2019.01)

(52) U.S. Cl.
CPC ......... *H04L 63/0263* (2013.01); *G06N 20/00* (2019.01); *H04L 63/1425* (2013.01)

(58) Field of Classification Search
CPC ............. H04L 63/0263; H04L 63/1425; H04L 63/166; H04L 63/1416; G06N 20/00
See application file for complete search history.

(56) References Cited

U.S. PATENT DOCUMENTS

| | | | | |
|---|---|---|---|---|
| 5,040,214 A * | 8/1991 | Grossberg | ............ | G06V 10/451 704/204 |
| 6,078,681 A * | 6/2000 | Silver | .................... | G02B 21/32 382/284 |
| 7,584,507 B1 * | 9/2009 | Nucci | ................. | H04L 63/1416 726/22 |
| 7,584,807 B2 * | 9/2009 | Berger | ...................... | E21B 7/18 175/14 |
| 9,596,254 B1 * | 3/2017 | Muddu | ............... | G06F 16/9024 |
| 10,432,660 B2 * | 10/2019 | Crabtree | ............. | H04L 63/1433 |
| 10,594,714 B2 * | 3/2020 | Crabtree | ................. | H04L 63/20 |
| 10,728,262 B1 * | 7/2020 | Vaswani | ................. | G06F 21/62 |

(Continued)

FOREIGN PATENT DOCUMENTS

| | | | | |
|---|---|---|---|---|
| AU | 2014204252 A1 * | 8/2015 | ........... | G02B 27/017 |
| CA | 2614795 A1 * | 6/2008 | ........... | G06F 9/4418 |

(Continued)

OTHER PUBLICATIONS

Mel, et al. "The NIST Definition of Cloud Computing". Recommendations of the National Institute of Standards and Technology. Nov. 16, 2015.

(Continued)

*Primary Examiner* — Shahriar Zarrineh
*Assistant Examiner* — Gita Faramarzi
(74) *Attorney, Agent, or Firm* — Jared C. Chaney

(57) ABSTRACT

A method, system and apparatus for providing edge data correctness and correctness spread determination, including identifying an incorrectness bias in data received at an edge server of a network through a filter with filter rules, performing corrective measures to the data according to the incorrectness bias that is identified, and learning and automatically updating the filter rules of the filter based on an extent of the incorrectness bias of the data and spread of the incorrectness bias of the data to reduce latency in future data validation of the data.

18 Claims, 15 Drawing Sheets

(56) References Cited

U.S. PATENT DOCUMENTS

| | | | |
|---|---|---|---|
| 11,537,875 B2* | 12/2022 | Kozhaya | G06N 3/08 |
| 2003/0202660 A1* | 10/2003 | Zhou | H04N 7/1675 |
| | | | 348/E7.056 |
| 2014/0288995 A1* | 9/2014 | Huff | G06Q 10/0635 |
| | | | 705/7.28 |
| 2016/0070614 A1 | 3/2016 | Joshi et al. | |
| 2017/0337469 A1* | 11/2017 | Debes | G06N 3/049 |
| 2019/0058715 A1* | 2/2019 | Abbaszadeh | H04L 63/1416 |
| 2019/0173893 A1* | 6/2019 | Muddu | G06F 16/9024 |
| 2019/0260789 A1* | 8/2019 | Hagi | G06N 3/049 |
| 2019/0265971 A1 | 8/2019 | Behzadi et al. | |
| 2019/0347578 A1* | 11/2019 | Bolding | H04L 63/1433 |
| 2021/0051177 A1* | 2/2021 | White | H04L 67/56 |
| 2021/0081717 A1* | 3/2021 | Creed | G06N 5/022 |
| 2021/0286338 A1* | 9/2021 | Karako | G05B 19/406 |
| 2021/0407308 A1* | 12/2021 | Brubaker | G06Q 10/107 |
| 2023/0115704 A1* | 4/2023 | Singh | G06V 40/10 |
| | | | 705/333 |

FOREIGN PATENT DOCUMENTS

| | | | | |
|---|---|---|---|---|
| CA | 2674327 A1 | * | 2/2010 | G06F 12/06 |
| CN | 111327604 A | | 6/2020 | |
| WO | WO-2005017690 A2 | * | 2/2005 | G06F 11/0748 |
| WO | WO 2018/233013 A1 | | 12/2018 | |
| WO | WO-2020146036 A1 | * | 7/2020 | G05B 19/042 |

OTHER PUBLICATIONS

Anuroop Gaddam, et al., "Detecting Sensor Faults, Anomalies and Outliers in the Internet of Things: A Survey on the Challenges and Solutions".

Authors et al., Disclosed Anonymously, "System and Method for Automatic Detection and Removal of Erroneous Data from Distributed Sensors", An IP.com Prior Art Database Technical Disclosure, IP.com No. IPCOM000258617D; IP.com Electronic Publication Date: May 29, 2019.

* cited by examiner

FIG. 4 pattern detection could indicate either a man-in-the-middle or an identity spoofing issue 310

Temporal simulation and correlation of the incoming data to detect embedded data threats 312

Security filter rules created/enhanced by the system for mitigating incorrectness spread and bias are varied across application/usage classes and the learning method provides this adaptation 314

FIG. 6 threat can be already a known threat 350 in case the identified security threat is classified as a new security threat (at, e.g., class and incorrectness filters 20 and 24) then the associated data set undergoes through a new security class definition phase 352 data set is passed through a data learning program where various aspects of the data set are input and the output are analyzed to come out with the new security threat classification and a knowledge corpus is created) 354

New security threat is provided with the various threat parameters including the appropriate action to be taken to neutralize the threat 356

EDGE DATA CORRECTNESS AND CORRECTNESS SPREAD DETERMINATION

BACKGROUND

The present invention relates to an embodiment of a method, apparatus, and system for data correctness and correctness determination, and more particularly, but not by way of limitation, relates to a method, apparatus, and system for edge data correctness and correctness spread determination.

With all the increased use of data communication devices and methods there have been problems with data correctness, integrity and identification and securing of the incoming data. For example, there have been problems with the data received from a from man to machine or machine to machine interfaces for the 5G (fifth generation technology standard for broadband cellular networks), IoT (Internet of Things) devices and other data measurement and collection devices into a computation environment. There is a class of security threats from the data where there is incorrect information and is provided to the transactions to either initiate, during the course of the transaction, for error conditions, for completing a transaction, or a measurement from a sensor that is transferred to network systems in response to a control signal or measurements that is periodically transferred.

Therefore, there is a need to have techniques that can reduce or eliminate security threats from incorrect information. Therefore, there is a need to be able to detect efficiently incorrect data driven security issues.

SUMMARY

In view of the foregoing and other problems, disadvantages, and drawbacks of the aforementioned background art, an exemplary aspect of the disclosed invention provides a method, apparatus, and system for edge data correctness and correctness spread determination.

An embodiment of the present invention, a method for providing edge data correctness and correctness spread determination, including identifying an incorrectness bias in data received at an edge server of a network through a filter with filter rules, performing corrective measures to the data according to the incorrectness bias that is identified, and learning and automatically updating the filter rules of the filter based on an extent of the incorrectness bias of the data and spread of the incorrectness bias of the data to reduce latency in future data validation of the data.

An embodiment of the present invention includes a system for providing edge data correctness and correctness spread determination, including a memory storing computer instructions, and a processor configured to execute the computer instructions to identify an incorrectness bias in data received at an edge server of a network through a filter with filter rules, perform corrective measures to the data according to the incorrectness bias that is identified, and learn and automatically update the filter rules of the filter based on an extent of the incorrectness bias of the data and spread of the incorrectness bias of the data to reduce latency in future data validation of the data.

Another embodiment of the present invention, a computer program product comprising a computer readable storage medium having program instructions embodied therewith, the program instructions readable and executable by a computer to cause the computer to perform a method for providing edge data correctness and correctness spread determination, including identifying an incorrectness bias in data received at an edge server of a network through a filter with filter rules, performing corrective measures to the data according to the incorrectness bias that is identified, and learning and automatically updating the filter rules of the filter based on an extent of the incorrectness bias of the data and spread of the incorrectness bias of the data to reduce latency in future data validation of the data.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The exemplary aspects of the invention will be better understood from the following detailed description of the exemplary embodiments of the invention with reference to the drawings.

FIG. 4 illustrates additional features of a non-limiting example embodiment of the present invention.

FIG. 6 illustrates security threat classification.

DETAILED DESCRIPTION

Figure 1:
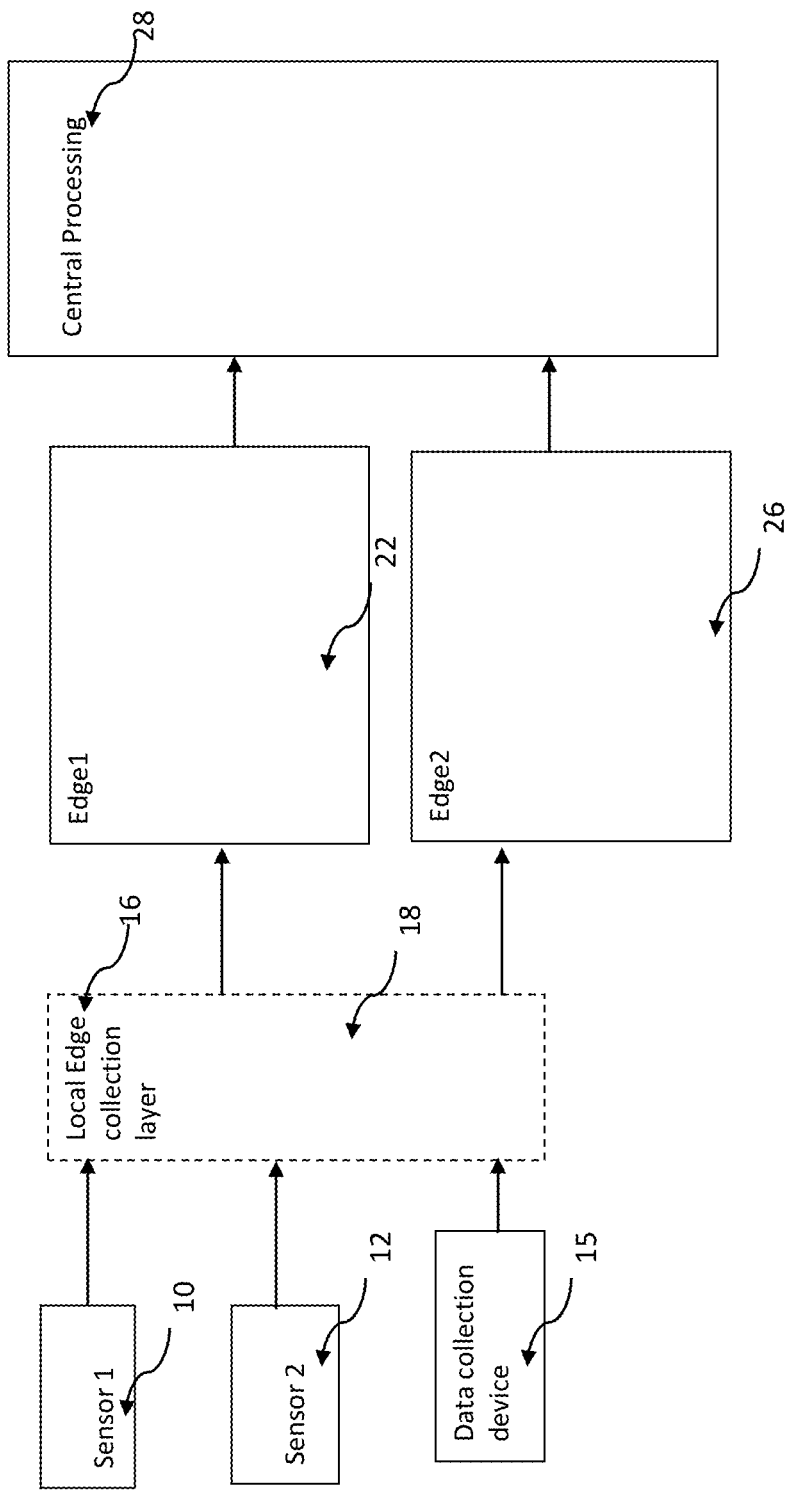
FIG. 1 illustrates a non-limiting example system of an embodiment of the present invention.

The invention will now be described with reference to the drawing figures, in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims. Moreover, please note that any of the steps can be performed in different sequences or combined or at the same time. In addition, any of structures and embodiments shown can be modified or combined.

A few of the problems being solved relates to data correctness, integrity and identification and securing of the incoming data from a user to machine or machine to machine interfaces for the 5G, IoT devices and other data measurement and collection devices into the computation environment. There is, for example, a class of security threats from the data that is incorrect information and is provided to the transactions to either initiate, during the course of the transaction, for error conditions, for completing a transaction, or a measurement from a sensor that is transferred to the edge systems in response to a control signal or measurements that is periodically transferred.

This data incorrectness (in the information which is an assemblage of different data pieces) issue can have serious consequences for an organization. For example, there can be problems, such as ordering of products that are unavailable at random and not placing firm orders, but sufficient to show an increased consumer interest. Another example can also be sensor data having a long-range anomaly pattern with another set of indicators such as weather leading to wrong maintenance order or upgrade order. Yet another example is identity spoofing or man in the middle. Identity spoofing can refer to the action of assuming to taking on the identity of some other entity (human or non-human) and then using that identity to accomplish a goal. An adversary may craft messages that appear to come from a different principle or use stolen or spoofed authentication credentials. A man-in-the-middle (or monster-in-the-middle, machine-in-the-middle, etc.) attack is a cyberattack where the attacker secretly relays and possibly alters the communications between two parties who believe that they are directly communicating with each other.

Another example of data incorrectness is legitimate transactions (over-riding of sensor measurements from one IoT sensor in 5G) that are processed unique in a narrow temporal duration. There are different types of data quality review at a lower level when data is received is needed to raise awareness in decision making or at a future point when the data is used.

The signals could be encrypted and secure. However there is a risk that incorrect data camouflaged as legitimate data is randomly or in a larger periodicity embedded in incorrect, incomplete or valid data transactions in any point of data input to the system and that could be used to trigger incorrect responses from systems. Such data may not be outliers but could be patterned to be recognized as legitimate by systems resulting in consequences to the company.

Some examples are results such as showing a fake demand for a particular SKU (stock keeping unit) that the company is led to believe that there is a demand due to random digital spoofing leading to a belief of a number of missed sale opportunity for a SKU and making an order for such a SKU only to not having any sale of it in the ensuring period.

Another example is of a temperature measurement reported by one IoT sensor that is beaming the signal periodically and another IoT sensor in the neighborhood beams an over-riding signal periodically showing a higher temperature that it shows some malfunction in the system under control and so either it has to be enhanced at a cost or that over a period it triggers a response that can be dangerous such as some system shutdown, etc.

Therefore, there is a need to be able to detect such incorrect data driven security issues. The incorrect data driven security issues are unfortunately not identifiable by standard network security breach detection since such data gets collected and analyzed leading to incorrect interpretations, biases, and learnings. The incorrect data driven security issues need to be done at each instant of data collection where a set of rules determine not only the validity of the data but if the data is a true representation of the source.

Q-Radar™, Biloxi™, etc. are software security tools that look at various computer network security aspects but not much in the data quality and seeming incorrectness of a data received At the big data analysis level, time series variation anomaly detection has been performed. These analyze the data series for any time series anomaly by statistical techniques to look at outliers or data points not following a specific pattern.

Current software security solutions look more into network security than at the data level or when the data quality is analyzed at a later point, the data incorrectness cannot be easily discovered and could lead to wrong analysis, conclusions and decision making that would be expensive for the clients.

Inconsistent measured data can lead to incorrect interpretations, biases, beliefs, and learnings. One point to consider includes how does it break into the network especially with a man in the middle approach or data that is responded back on a transaction but can get introduced and infect the systems. Another point to consider is to whether there are these signatures that one can look at and see which is the data combination that seems abnormal. In 5G there are a number of sensors that beam the information, but determination that it is a correct signal, not over-ridden, spoofed, etc. is a major challenge.

FIG. 1 illustrates a non-limiting example system of an embodiment of the present invention.

The local edge collection layer 16 receives information collected by a first sensor 10 and a second sensor 12. The information could be transmitted through 5G or other protocols from the sensors 10, 12 or other IoT device. The local edge collection layer 16 is connected to a first edge server (or edge device) 22 and a second edge server (or edge device) 26. A third data collection device or IoT device or other device 15 communicates with the first edge server 22 and the second edge server 26 via the local edge collection layer 16. The data collection device 15 can be another sensor, keyboard or other input device for manual input, or other type data collection device or input device, etc. The first edge server 22 and the second edge server 26 communicate with the central processing server (or central processing device) 28 of the system 100.

Figure 2:
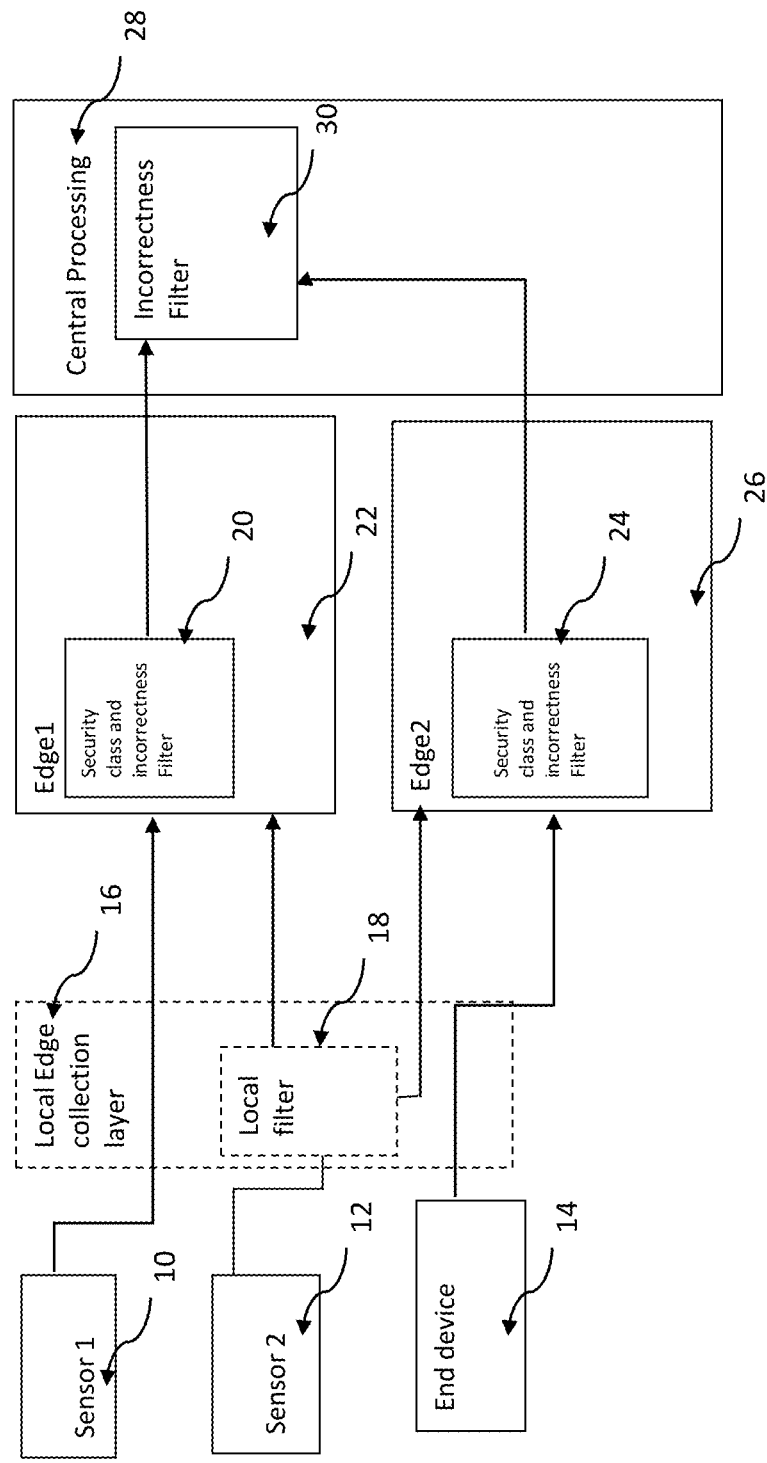
FIG. 2 illustrates a more detailed view of the non-limiting example system of an embodiment of the present invention.

FIG. 2 illustrates a more detailed view of the non-limiting example system of an embodiment of the present invention.

A third sensor or data collection form, or other data collection or end device (M2MI (Machine-to-Machine Interface) or MMI (man-machine interface)) 14 communicates with the first edge server (device) 22 and/or the second edge server (device) 26 via the local edge collection layer 16. The local edge collection layer 16 can include a local filter (or local security filter) 18 that filters the information collected from, for example, the second sensor 12 to provide to the filtered information to the first edge server 22 and the second edge server 26. The first edge server 22 can include a security class and incorrectness filter 20 that provides a security class and filters for incorrectness from the input received from the local edge collection layer 16. The second edge server 26 can include a security class and incorrectness filter 24 that provides a security class and filters for incorrectness from the input received from the local edge collection layer 16. The central processing server (or central processing device) 28 can include an incorrectness filter (or incorrectness security filter) 30 that further filters the input from the first edge server 22 and the second edge server 26.

The first edge server 22 and the second edge server 26 are the first points where the information from the sensors 10, 12, and end device 14 is collected in the system 100. If the system 100 were to wait until later then additional data could be added to further complicate correction of any incorrectness issue. As the data flows into the system 100, the incoming data from sensors 10, 12, and end device 14 can be flagged where they may need further analysis or allow the data to be stopped or the data to be forwarded.

A cognitive element as detailed further is for the system 100 to learn as it receives or measures the input data from sensors 10, 12 and end device 14. Relationship of the collected data received from sensors 10, 12, and end device 14 can be analyzed to reflect whether it is the correct data at the first edge server 22 through the security class and incorrectness filter 20 and the second edge server 26 through the security class and incorrectness filter 24 and also further down as needed at the central processing server 28 through the incorrectness filter 30. Processing at the edge (i.e., first edge server 22 and second edge server 26) of the system 100 avoid costly mitigation to correct incorrectness of the data.

The system 100 in essence is able to manipulate interpretation of the collected data. For example, if sensors, keyboard, etc. (at, e.g., sensors 10, 12, and end device 14) collect information of picking up orders distribution, a warehouse employee could pick up the order from wrong place which would then input incorrect information into the edge servers 22, 26 via the collection at the local edge collection layer 16. If the collected data at sensors 10, 12, and/or end device 14 does not match the correct data, incorrectness of the data would be detected at the edge severs 22, 26, or as needed via the incorrectness filter 30 at the central processing server 28. The collected data can be collected from sensors 10, 12, or can be keyed input by a user or entered by another machine at end device 14.

Limiting or remedying the incorrectness problem at the first edge server 22 and the second edge server 26 itself mitigates an expensive security concern that is detected downstream or upstream from the system 100. The edge servers 22 and 26 are servers located at the network edge to reduce latency. The edge servers 22 and 26 are a type of edge device that provides an entry point into a network. The edge servers 22 and 26 provide the system 100 to be able to make decisions quickly rather than waiting for processing at a central processing server 28. The system 100 may not have the time to send data to a large analytic center at the central processing server 28 to make that decision of incorrectness. The system 100 needs to stop data incorrectness as immediately as possible. Thereby, what is then being transmitted by system 100 is leaner and more efficient. It is a more cost-effective way of dealing with the collected data. Additionally, having extra data held at the central processing server would not help. The system 100 is then able to find out what is needed to rectify any incorrect data quickly.

For example, if there is a robotic arm on a manufacturing line, and the robotic arm needs to be able to react quickly because is too close to a person for safety reasons, or stop a line because it has identified a problem using its vision capability, the system 100 needs to be able to make that decision quickly via the edge servers 22 and 26. The system 100 does not have the time to send data to the large analytic center at the central processing server 28 to make that decision. The system 100 needs to stop the further processing of the collected data immediately and rectify immediately to avoid costly and time-consuming corrections at a later time.

If the system 100 catches the problem with the data at edge servers 22 and 26, then the system 100 can take additional measurement at that point from the sensors 10, 12, and end device 14. For example, the system 100 can take an additional picture or perform a further chemical analysis at sensor devices 10, 12, and end device 14, and if the system determines if the collected information is still wrong, the system can take additional measurement at that point from sensors 10, 12, and end device 14 by the edge servers 22 and 26. If the collected data were to go into the cloud, then it would be difficult to go back, and then undo the past what processing is already performed on the collected data.

If at the edge servers 22 and 26, the collected data from the sensors 10, 12, and end device 14 is determined to be inconsistent, then the system 100 can take measurements again at the sensors 10, 12 and end device 14. If such problems are determined with the collected data, then the system 100 can take immediate remeasurement of the received collected data. Therefore, the collected data can be corrected for incorrectness in real time, rather than being processed at a later time which would be more expensive and require additional processing and time and in some instances be impossible to remedy where further processing on the data cannot be reversed.

One of the ideas here is related to definition of the data incorrectness bias. When the edge system 100 accepts data from sensors 10, 12 or end devices (M2MI (Machine-to-Machine Interface) or MMI (man-machine interface)) 14, at the entry point, different filter rules are applied to detect the incorrectness as applied in, for example, the local filter 18, security class and incorrectness filter 20 in the first edge server 22, security class and incorrectness filter 24 in the first edge server 26, and the incorrectness filter 30 in the central processing server 28.

These filters 18, 20, 24, and 30 include temporal simulation of historical flagged data with the current data and a temporal estimate of future data inputs to determine the anomalous patterns and the extent of data incorrectness bias. Based on the control actions, either such data is corrected or the data is flagged so that a future use of such data in analysis and decision making can consider the incorrectness bias flag to determine the impact of incorporating/removal such flagged data in analysis and decision making.

The learning system 100 at, for example, the edge servers 22 and 26, analyzes data from each transaction and bunched transaction sets to determine the incorrectness spread and adjusts the rules if it finds temporal or spatial variation to the inputs such as primary measurement data, multi-modal inputs such as pictures, audio, scents and other sensory inputs.

Figure 3:
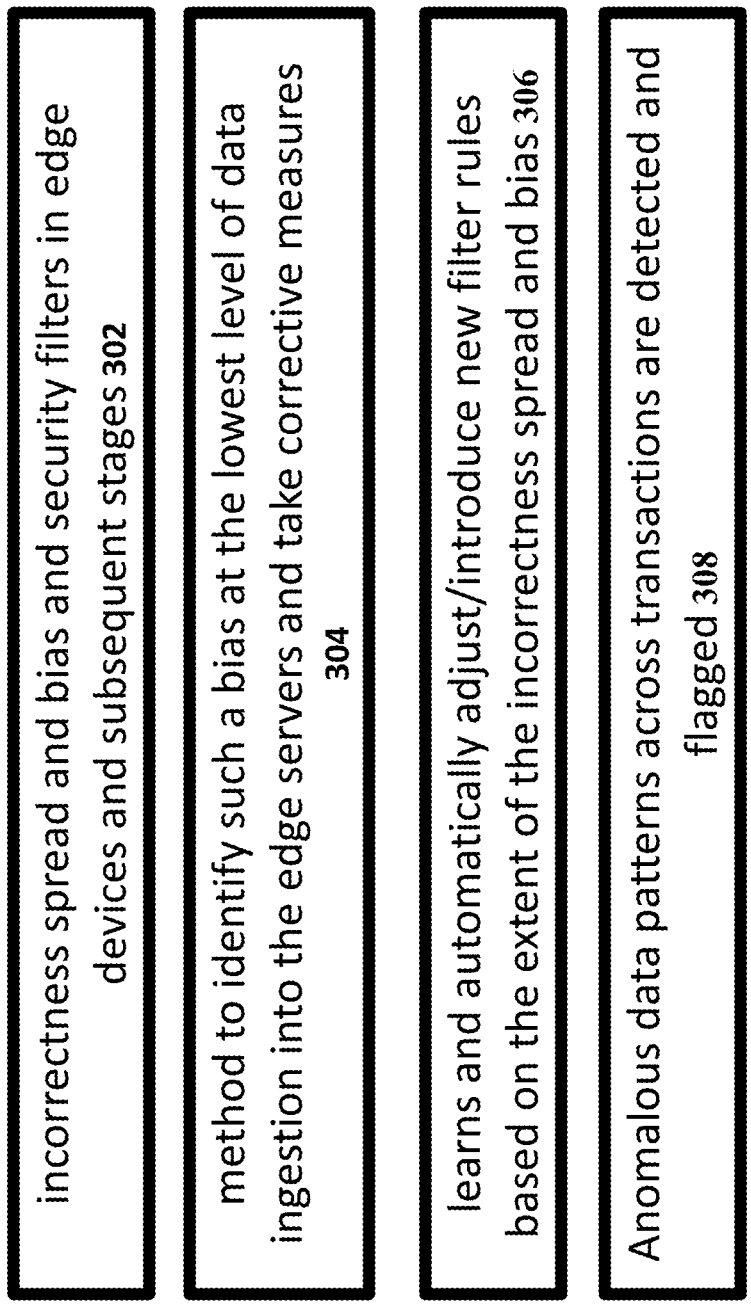
FIG. 3 illustrates features of a non-limiting example embodiment of the present invention.

FIG. 3 illustrates features of a non-limiting example embodiment of the present invention. Some of the features of the present invention are as follow.

The system 100 provides introduction of incorrectness spread and bias and security filters 20 and 24 in edge devices 22 and 26, respectively, and subsequent stages (such as the incorrectness filter 30 in central processing server or device 28) as necessary to identify incorrectness bias as the data will be valid, with integrity and satisfy data quality specifications and needs during computation steps 302.

The system 100 includes a method to identify such a bias at the lowest level of data ingestion into the edge servers 22 and 26 and take corrective measures to flag the data/record or adjust the value 304.

The system 100 learns and automatically adjust/introduce new filter rules based on the extent of the incorrectness spread and bias to reduce latency in future data validation 306.

Anomalous data patterns across transactions are detected and flagged 308 by the system 100 at, for example, preferably at the edge servers 22 and 26. The data patterns across transactions can also be detected and flagged 308 further down in the central processing server/device 28 if necessary.

FIG. 4 illustrates additional features of a non-limiting example embodiment of the present invention.

Some of the pattern detection could indicate either a man-in-the-middle or an identity spoofing issue while the data incorrectness bias may not be a primary issue and appropriately flagged 310 by the system 100.

Temporal simulation and correlation of the incoming data is performed by the system 100 to detect embedded data threats 312.

Security filter rules created/enhanced by the system 100 for mitigating incorrectness spread and bias are varied across application/usage classes and the learning method provides this adaptation 314.

The advantages of this solution are lowering of the costs from data incorrectness anomaly incorrectly impacting decision making such as a market for unavailable SKUs, unnecessary maintenance or enhancement of systems 100 as also time spent during analysis and decision making at a future time, where identification and correction of such records and data patterns will be more expensive as such un-flagged data may meet the data quality needs but influence the outcomes with a bias. Thus, catching and flagging them at the time of collection (at for example, local edge collection layer 16 and edge server/devices 22 and 26) can save corporations time, material and costs.

Organizations deal with a lot of data that is coming in from different data sources. Data, for example, is being inputted by the customer (user) as part of the engagement models. Screens or interfaces for data entry that are offered may act as the entry point for the incorrect data source (e.g., end device 14). There are chances that the data being captured and sent back by the various sensors 10, 12, or end device 14 in an IoT solution or data being exchanged by the sensors 10, 12, and end device 14 might be incorrect.

As shown, there is a need to be able to detect such data driven security issues. These are unfortunately not identifiable by standard security breach detection since such data gets collected and analyzed leading to incorrect interpretations, biases, beliefs, and/or learnings. As previously mentioned, detecting such data driven security issues need to be done at each instant of data collection where a set of rules determine not only the validity of the data but if the data is a true representation of the source.

Embodiments of the invention include a framework that has one or several data validation, simulation & detection wrappers that includes several types of hooks and end points that bypass typical data quality checks. This data security layer can help with the following.

Figure 5:
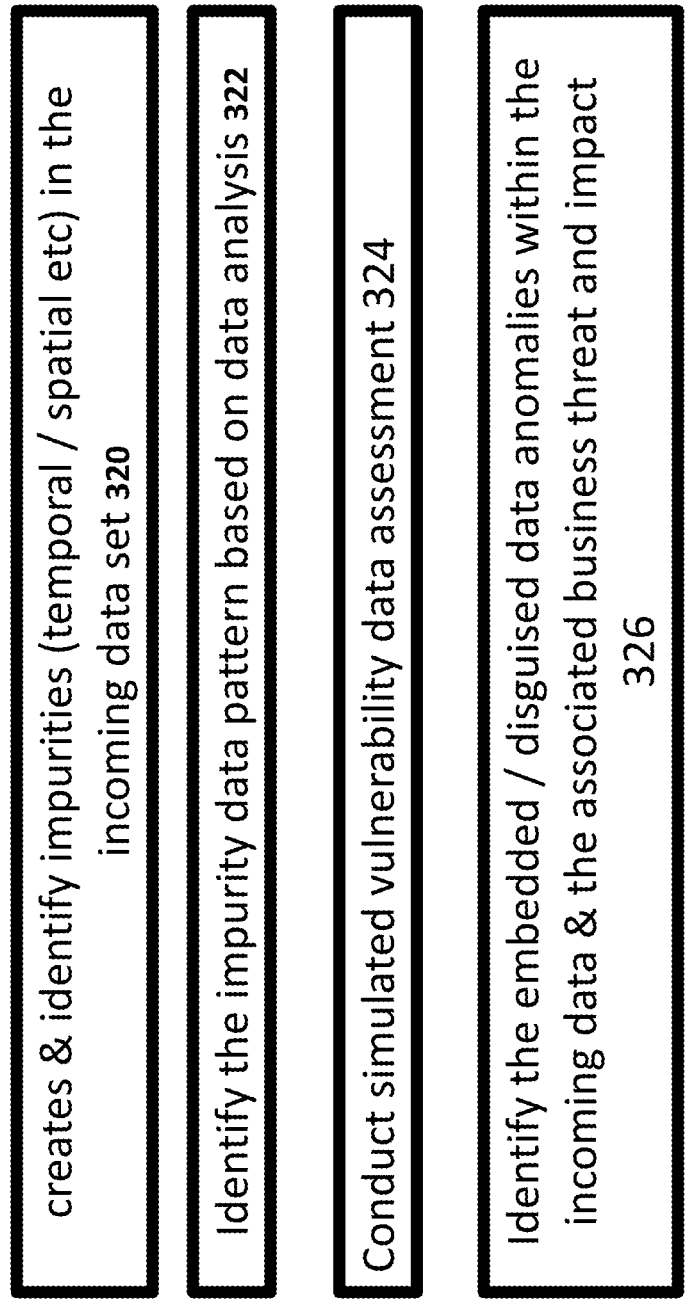
FIG. 5 illustrates features of the data security layers.

FIG. 5 illustrates features of the data security layers.

The system creates and identify impurities (temporal/spatial etc.) in the incoming data set 320.

The system 100 identifies the impurity data pattern based on data analysis 322.

The system 100 conducts simulated vulnerability data assessment 324.

The system 100 identifies the embedded/disguised data anomalies within the incoming data & the associated business threat and impact 326.

This data security layer also defines a set of governing steps in the assessment framework for each class of security (at, e.g., class and incorrectness filters 20 and 24) such as extreme, tight, standard and light and there can be several layers with each defining a different security class threat. The hooks or links or termination during the data analysis stage leads to a state of secure position by lowering increasing/tightening the security position to the level. The classification of the security level (at, e.g., class and incorrectness filters 20 and 24) would be useful in identifying the next level of action to be taken.

FIG. 6 illustrates security threat classification.

The security threat can be already a known threat and might require data sanitization 350. However, in case the identified security threat is classified as a new security threat (at, e.g., class and incorrectness filters 20 and 24) then the associated data set undergoes through a new security class definition phase 352. As part of this, the data set is passed through a data learning program where various aspects of the data set, such as attributes, context, data sources are input and the output are analyzed to come out with the new security threat classification and a knowledge corpus is created by, e.g., class and incorrectness filters 20 and 24) 354. The new security threat is provided with the various threat parameters including the appropriate action to be taken to neutralize the threat 356.

Figure 7:
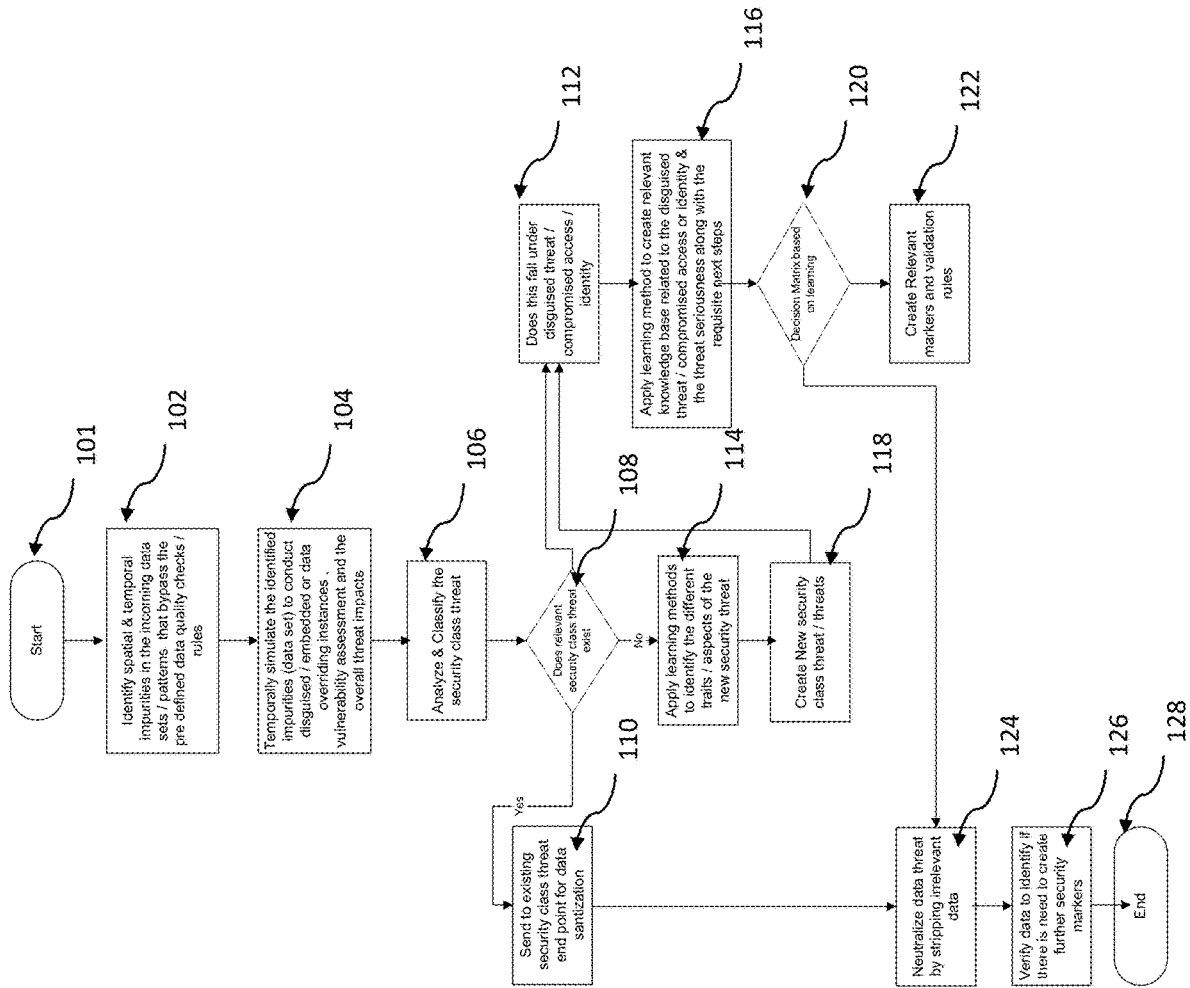
FIG. 7 illustrates a non-limiting example of a method of an embodiment of the present invention.

FIG. 7 illustrates a non-limiting example of a method of an embodiment of the present invention.

The system 100 starts 101 with identifying special and temporal impurities in the incoming data sets/patterns that bypass the pre-defined data quality checks/rules 102. The system 100 can make these identifications at the edge servers 22 and 26 or if necessary, downstream at the central processing server 28.

The system 100 temporarily simulates the identified impurities (data set) to conduct disguised/embedded or data overriding instances, vulnerability assessment and the overall threat impacts 104. The system 100 can perform this process at the edge servers 22 and 26 or if necessary, downstream at the central processing server 28.

The system 100 then analyzes and classifies the security class threat at block 106. The classification of the security thread can be performed through the use of the security class and incorrectness filter 20 in the first edge server 22 and the security class and incorrectness filter 24 in the second edge server 26.

The system 100 determines as to whether relevant security class threats exist at block 108. The system 100 also checks whether this fall under disguised threat/compromised access/identity in block 112. Again, the system 100 can perform these processes at the edge servers 22 and 26 and if necessary, downstream at the central processing server 28.

If the determination is "no" under block 108, then the system 100 applies learning methods to identify the different traits/aspects of the new security threat 114. Then the system 100 creates new security threat or threats at block 118. Then the system checks again whether this fall under disguised threat/compromised access/identity in block 112. Again, the system 100 can perform these processes at the edge servers 22 and 26 and if necessary, downstream at the central processing server 28.

If the determination is "yes" under block 108, then the system 100 sends to existing security class threat end point for data sanitization 110. The system 100 then neutralizes the data threat by stripping irrelevant data in block 124. Then, the system 100 verifies the data to identify if there is a need to create further security markers in block 126. Then the method ends at block 128. Again, the system 100 can perform these processes at the edge servers 22 and 26 and if necessary, downstream at the central processing server 28.

Returning to block 112, after the system 100 checks whether this fall under disguised threat/compromised access/identity in block 112, the system 100 applies a learning method to create relevant knowledge base related to the disguised threat/compromised access or identity and the threat seriousness along with the requisite next steps. The system 100 the provides a decision matrix based on learning 120. Then, the system 100 goes to block 124 to neutralize data threat by striping irrelevant data 124 and also creates relevant markers and validation rules 122. Again, the system 100 can perform these processes at the edge servers 22 and 26 and if necessary, downstream at the central processing server 28.

Figure 8:
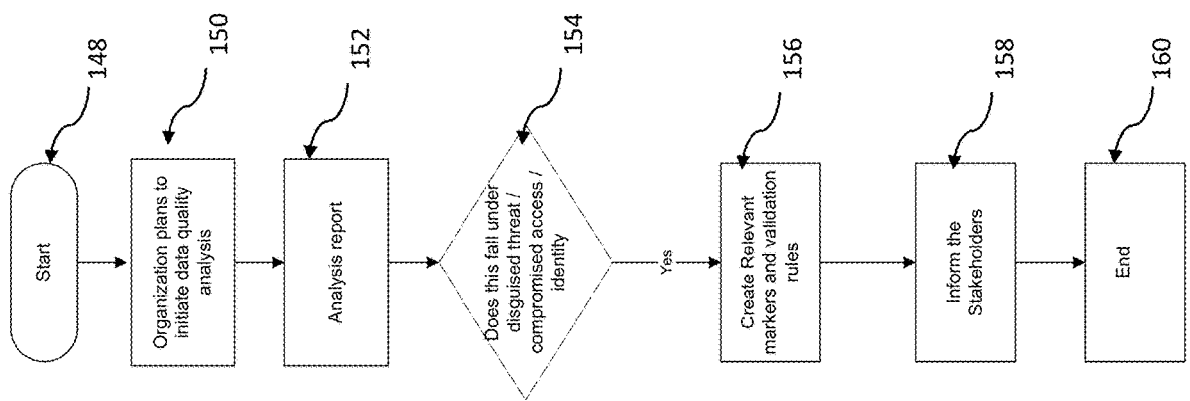
FIG. 8 illustrates a non-limiting example method of an embodiment of the present invention.

FIG. 8 illustrates a method of an embodiment of the present invention.

The system 100 starts 148 by providing organization plans to initiate data quality analysis 150. The system 100 then provides an analysis report 152. The system 100 then determines if this falls under disguised threat, compromised access and identity 154. If the determination is "yes" in block 154, then the system creates relevant markers and validation rules 156. The system 100 then informs the stakeholders 158, and then the method ends 160.

Figure 9:
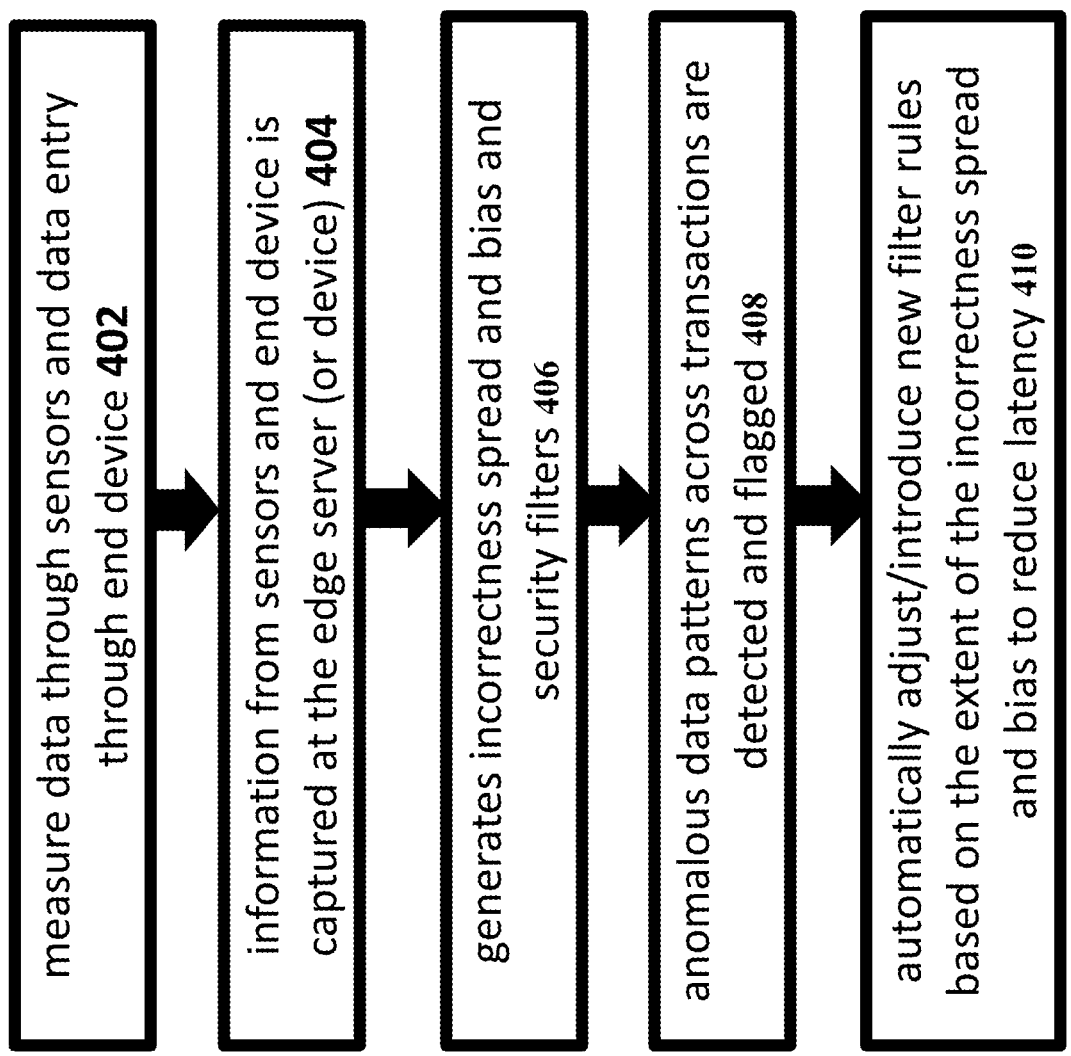
FIG. 9 illustrates another non-limiting example method of an embodiment of the present invention.

FIG. 9 illustrates another non-limiting example method of an embodiment of the present invention.

The first sensor 10 and second sensor 12 measure data, and a user or another machine enters information through an interface in the end device 14 at block 402.

The information from sensors 10, 12 and end device 14 is captured at the edge server (or device) 26 or 22 at block 404.

The system 100 generates incorrectness spread and bias and security filters preferably at the edge server (or devices) 26 and 22, but can also be generated in subsequent stages such as the central processing server (or device) 28 to identify incorrectness bias as the data will be valid, with integrity and satisfy data quality specifications and needs during computation steps at block 406.

Anomalous data patterns across transactions are detected and flagged at block 408. Some of the anomalous data patterns detected could indicate either a man-in-the-middle or an identity spoofing issue, or other security issues while the data incorrectness bias may not be a primary issue and appropriately flagged. Temporal simulation and correlation of the incoming data to detect embedded data threats.

The system 100 learns and automatically adjusts and introduces new filter rules based on the extent of the incorrectness spread and bias to reduce latency in future data validation at block 410. Security filter rules created/enhanced by the system for mitigating incorrectness spread and bias are varied across application/usage classes and the learning method provides this adaptation.

Figure 10:
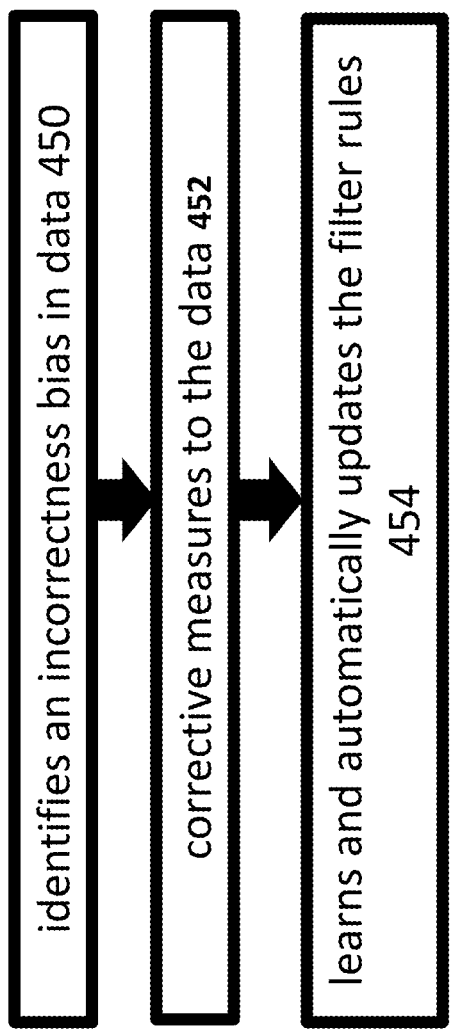
FIG. 10 illustrates yet another non-limiting example method of an embodiment of the present invention.

FIG. 10 illustrates yet another example method of an embodiment of the present invention.

The system 100 identifies an incorrectness bias in data received at an edge server 22 and 26 of a network through a filter 18, 22, 24, 30 with filter rules at block 450. The identifying of the incorrectness bias in the data received is identified at the edge server and subsequent stages of the network through the filter including a security filter. The identifying of the incorrectness bias of the data is at a lowest level of data ingestion into the edge server. The identifying can further include temporal simulation and correlation of the data received by the edge server to detect embedded data threats.

The system 100 performs corrective measures to the data according to the incorrectness bias that is identified 452. The corrective measures include flagging the data to adjust value of the data by remeasuring by a sensor 10, 12 or end device 14 that initially transmits the data to the edge server 22 and 26. The flagging of the data includes when anomalous data patterns across transactions are detected.

The system 100 learns and automatically updates the filter rules of the filter 18, 20, 24, and 30 based on an extent of the incorrectness bias of the data and spread of the incorrectness bias of the data to reduce latency in future data validation of the data at block 454. The filter rules are generated and enhanced into the updated filter rules to mitigate incorrectness spread and incorrectness bias varied across application and usage classes. The incorrectness bias spread and the incorrectness bias with the filter 18, 20, 24, and 30 including a security filter in the edge server 22 and 26 and subsequent stages (central processing server 28 including an incorrectness server 30) of the network are used to identify incorrectness of the data to validate data integrity.

Different features shown in different figures from FIGS. 1 through 10 can be combined, changed or switched between the different examples. System 100 is merely shown as a non-limiting example for illustration purposes. Any other configuration could be used. For example, the system 100 shown in FIGS. 1 through 10 can also be implemented in hardware and software shown in FIGS. 11 through 15.

Figure 11:
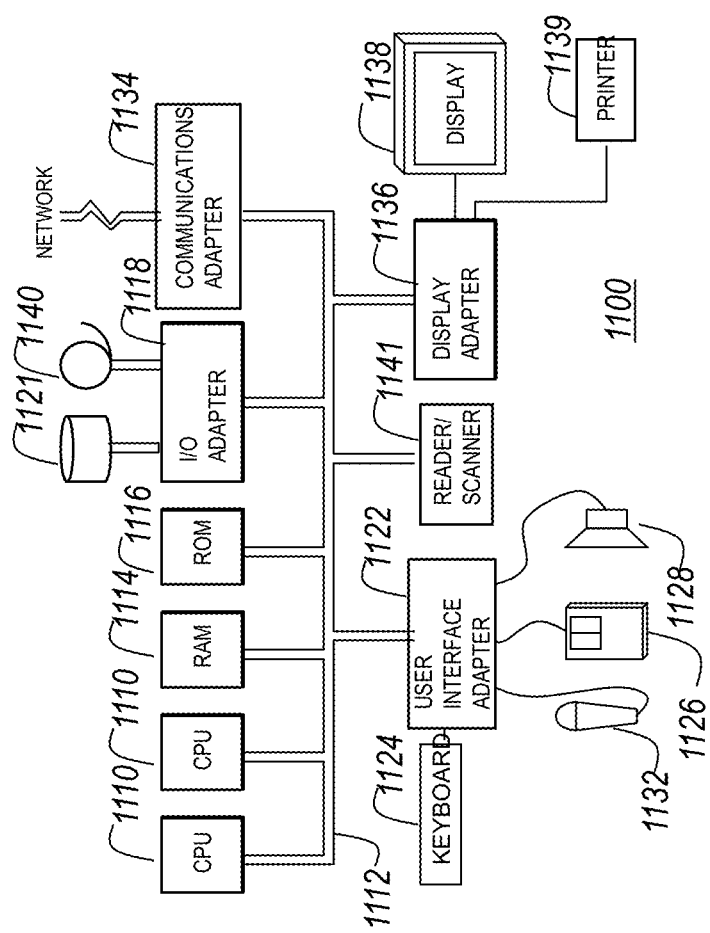
FIG. 11 illustrates an exemplary hardware/information handling system for incorporating the example embodiment of the present invention therein.
Figure 12:
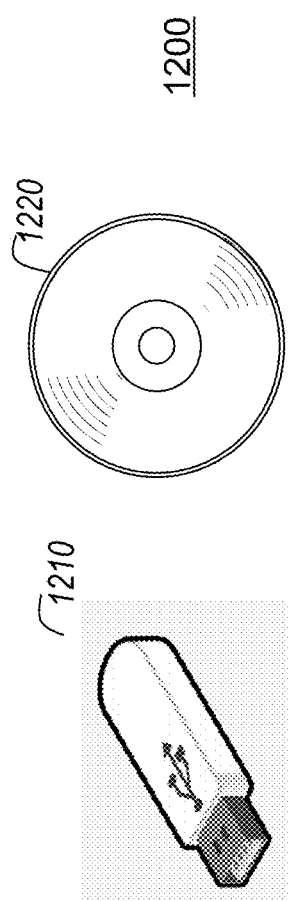
FIG. 12 illustrates a signal-bearing storage medium for storing machine-readable instructions of a program that implements the method according to the example embodiment of the present invention.

FIG. 11 illustrates another hardware configuration of the system, where there is an information handling/computer system 1100 in accordance with the present invention and which preferably has at least one processor or central processing unit (CPU) 1110 that can implement the techniques of the invention in a form of a software program for software intelligence as-a-service.

The CPUs 1110 are interconnected via a system bus 1112 to a random access memory (RAM) 1114, read-only memory (ROM) 1116, input/output (I/O) adapter 1118 (for connecting peripheral devices such as disk units 1121 and tape drives 1140 to the bus 1112), user interface adapter 1122 (for connecting a keyboard 1124, mouse 1126, speaker 1128, microphone 1132, and/or other user interface device to the bus 1112), a communication adapter 1134 for connecting an information handling system to a data processing network, the Internet, an Intranet, a personal area network (PAN), etc., and a display adapter 1136 for connecting the bus 1112 to a display device 1138 and/or printer 1139 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, including signal-bearing storage media tangibly embodying a program of machine-readable instructions executable by a digital data processor incorporating the CPU 1110 and hardware above, to perform the method of the invention.

This signal-bearing storage media may include, for example, a RAM contained within the CPU 1110, as represented by the fast-access storage for example.

Alternatively, the instructions may be contained in another signal-bearing storage media 1200, such as a flash memory 1210 or optical storage diskette 1220 (FIG. 12), directly or indirectly accessible by the CPU 1110.

Whether contained in the flash memory 1210, the optical disk 1220, the computer/CPU 1110, or elsewhere, the instructions may be stored on a variety of machine-readable data storage media.

Therefore, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 13:
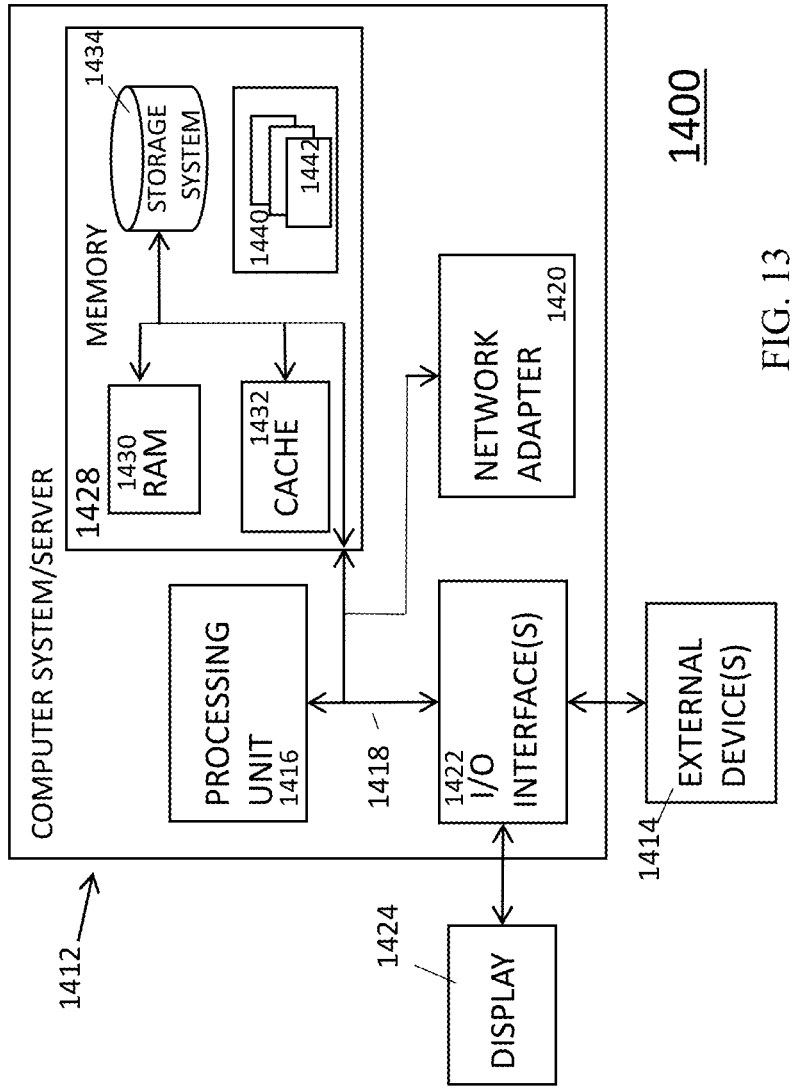
FIG. 13 depicts a cloud computing node according to an example embodiment of the present invention.

Referring now to FIG. 13, a schematic 1400 of an example of a cloud computing node is shown. Cloud computing node 1400 is only one example of a suitable cloud computing node and is not intended to suggest any limitation as to the scope of use or functionality of embodiments of the invention described herein. Regardless, cloud computing node 1400 is capable of being implemented and/or performing any of the functionality set forth hereinabove. As mentioned previously, system 100 of FIG. 1 can be implemented in a cloud infrastructure such as FIG. 13 (and also FIGS. 14 and 15). In cloud computing node 1400 there is a computer system/server 1412, which is operational with numerous other general purpose or special purpose computing system environments or configurations. Examples of well-known computing systems, environments, and/or configurations that may be suitable for use with computer system/server 1412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1412 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 1412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 13, computer system/server 1412 in cloud computing node 1400 is shown in the form of a general-purpose computing device. The components of computer system/server 1412 may include, but are not limited to, one or more processors or processing units 1416, a system memory 1428, and a bus 1418 that couples various system components including system memory 1428 to processor 1416.

Bus 1418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 1412 typically includes a variety of computer system readable media. Such media may be any available media that is accessible by computer system/server 1412, and it includes both volatile and non-volatile media, removable and non-removable media.

System memory 1428 can include computer system readable media in the form of volatile memory, such as random-access memory (RAM) 1430 and/or cache memory 1432. Computer system/server 1412 may further include other removable/non-removable, volatile/non-volatile computer system storage media. By way of example only, storage system 1434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1418 by one or more data media interfaces. As will be further depicted and described below, memory 1428 may include at least one program product having a set (e.g., at least one) of program modules that are configured to carry out the functions of embodiments of the invention.

Program/utility 1440, having a set (at least one) of program modules 1442, may be stored in memory 1428 by way of example, and not limitation, as well as an operating system, one or more application programs, other program modules, and program data. Each of the operating system, one or more application programs, other program modules, and program data or some combination thereof, may include an implementation of a networking environment. Program modules 1442 generally carry out the functions and/or methodologies of embodiments of the invention as described herein.

Computer system/server 1412 may also communicate with one or more external devices 1414 such as a keyboard, a pointing device, a display 1424, etc.; one or more devices that enable a user to interact with computer system/server 1412; and/or any devices (e.g., network card, modem, etc.) that enable computer system/server 1412 to communicate with one or more other computing devices. Such communication can occur via Input/Output (I/O) interfaces 1422. Still yet, computer system/server 1412 can communicate with one or more networks such as a local area network (LAN), a general wide area network (WAN), and/or a public network (e.g., the Internet) via network adapter 1420. As depicted, network adapter 1420 communicates with the other components of computer system/server 1412 via bus 1418. It should be understood that although not shown, other hardware and/or software components could be used in conjunction with computer system/server 1412. Examples, include, but are not limited to: microcode, device drivers, redundant processing units, external disk drive arrays, RAID systems, tape drives, and data archival storage systems, etc.

Figure 14:
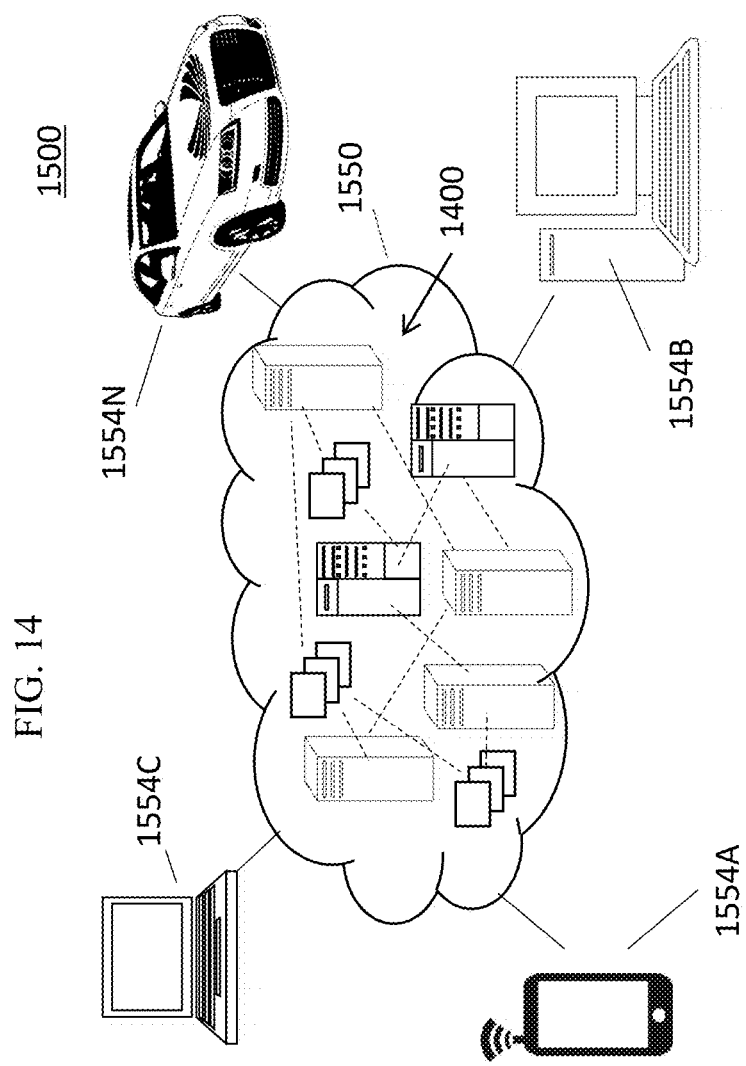
FIG. 14 depicts a cloud computing environment according to an example embodiment of the present invention.

Referring now to FIG. 14, illustrative cloud computing environment 1550 is depicted. As shown, cloud computing environment 1550 includes one or more cloud computing nodes 1400 with which local computing devices used by cloud consumers, such as, for example, personal digital assistant (PDA) or cellular telephone 1554A, desktop computer 1554B, laptop computer 1554C, and/or automobile computer system 1554N may communicate. Nodes 1400 may communicate with one another. They may be grouped (not shown) physically or virtually, in one or more networks, such as Private, Community, Public, or Hybrid clouds as described hereinabove, or a combination thereof. This allows cloud computing environment 1550 to offer infrastructure, platforms and/or software as services for which a cloud consumer does not need to maintain resources on a local computing device. It is understood that the types of computing devices 1554A-N shown in FIG. 16 are intended to be illustrative only and that computing nodes 1400 and cloud computing environment 1550 can communicate with any type of computerized device over any type of network and/or network addressable connection (e.g., using a web browser).

Figure 15:
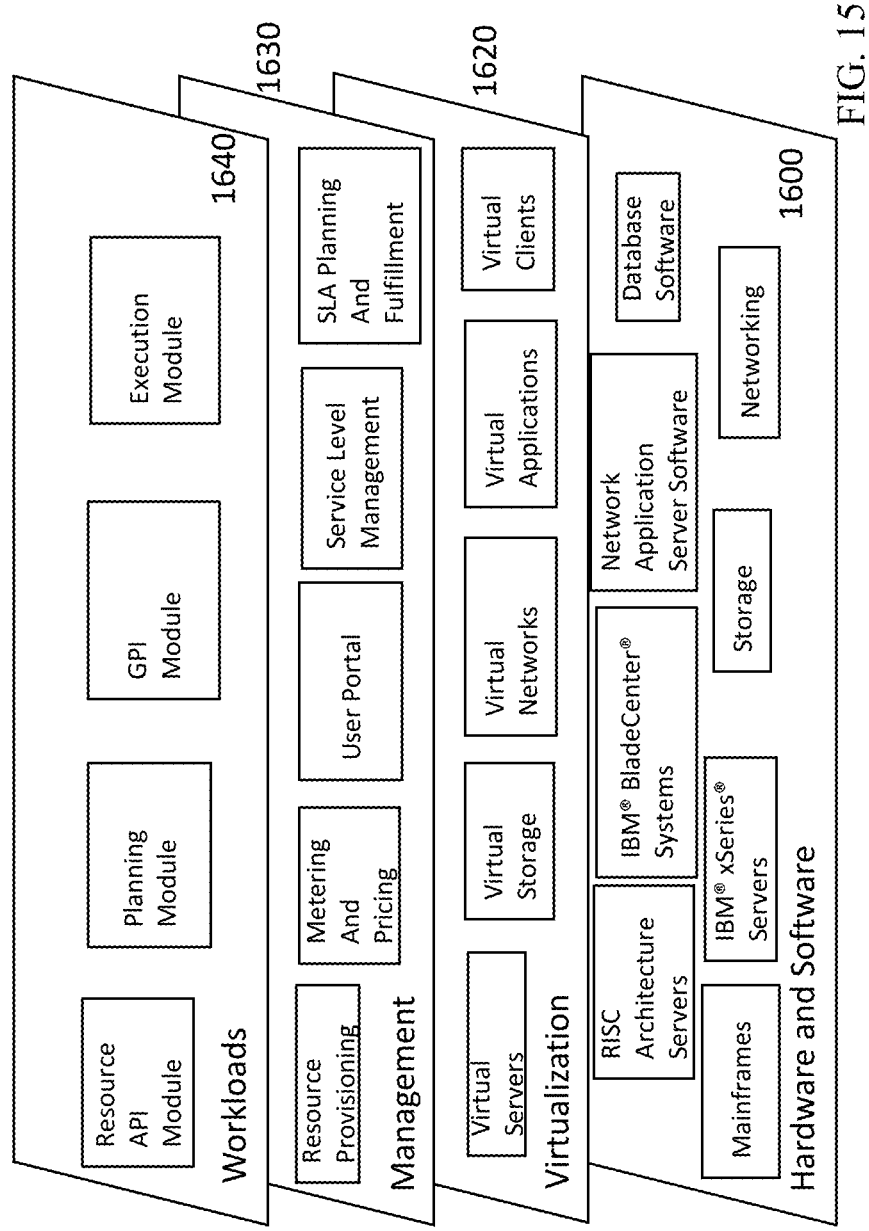
FIG. 15 depicts abstraction model layers according to an example embodiment of the present invention.

Referring now to FIG. 15, a set of functional abstraction layers provided by cloud computing environment 1550 (FIG. 14) is shown. It should be understood in advance that the components, layers, and functions shown in FIG. 15 are intended to be illustrative only and embodiments of the invention are not limited thereto. As depicted, the following layers and corresponding functions are provided:

Hardware and software layer 1600 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM Web Sphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 1620 provides an abstraction layer from which the following examples of virtual entities may be provided: virtual servers; virtual storage; virtual networks, including virtual private networks; virtual applications and operating systems; and virtual clients.

In one example, management layer 1630 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1640 provides examples of functionality for which the cloud computing environment may be utilized. Examples of workloads and functions which may be provided from this layer include such as functions shown above in FIGS. 1 through 10.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

What is claimed is:

1. A method for providing edge data correctness and correctness spread determination, comprising:
    identifying an incorrectness bias pattern in data received at an edge server of a network
    through a filter with filter rules,
        wherein the incorrectness bias includes spatial impurities in the data, and
        wherein spatial impurities include anomalous data that does not follow a pattern of other data in the data received,
    detecting, based on the incorrectness bias, anomalous data patterns, wherein the detected pattern indicates an identity spoofing issue;
    simulating vulnerability data assessments for the spatial impurities;
    identifying, based on the simulation, disguised data anomalies related to the spatial impurities from the incorrectness bias;
    performing corrective measures to the data according to the disguised data anomalies that are identified;
    learning and automatically updating the filter rules of the filter based on an extent of the incorrectness bias of the data and spread of the incorrectness bias of the data to reduce latency in future data validation of the data; and
    creating security filter rules configured to mitigate incorrectness spread and incorrectness bias, wherein the security filter rules are varied across application and usage classes, and wherein a learning method provides a variance for the security filter rules.

2. The method according to claim 1, wherein the identifying of the incorrectness bias in the data received is identified at the edge server and subsequent stages of the network through the filter including a security filter.

3. The method according to claim 1, wherein the identifying of the incorrectness bias of the data is at a lowest level of data ingestion into the edge server, and wherein the corrective measures include flagging the data to adjust value of the data by remeasuring by a sensor that initially transmits the data to the edge server.

4. The method according to claim 3, wherein the flagging of the data includes when anomalous data patterns across transactions are detected.

5. The method according to claim 1, wherein the identifying further includes temporal simulation and correlation of the data received by the edge server to detect embedded data threats.

6. The method according to claim 1 implemented in a cloud environment, wherein the incorrectness bias spread and the incorrectness bias with the filter including a security filter in the edge server and subsequent stages of the network are used to identify incorrectness of the data to validate data integrity.

7. A system for providing edge data correctness and correctness spread determination, comprising:
a memory storing computer instructions; and
a processor configured to execute the computer instructions to:
identify an incorrectness bias in data received at an edge server of a network through a filter with filter rules,
wherein the incorrectness bias includes spatial impurities in the data, and
wherein spatial impurities include anomalous data that does not follow a pattern of other data in the data received,
detecting, based on the incorrectness bias, anomalous data patterns,
wherein the detected pattern indicates an identity spoofing issue;
simulate vulnerability data assessments for the spatial impurities;
identify, based on the simulation, disguised data anomalies related to the spatial impurities from the incorrectness bias;
perform corrective measures to the data according to the disguised data anomalies that are identified;
learn and automatically update the filter rules of the filter based on an extent of the incorrectness bias of the data and spread of the incorrectness bias of the data to reduce latency in future data validation of the data; and
create security filter rules configured to mitigate incorrectness spread and incorrectness bias, wherein the security filter rules are varied across application and usage classes, and wherein a learning method provides a variance for the security filter rules.

8. The system according to claim 7, wherein the identifying of the incorrectness bias in the data received is identified at the edge server and subsequent stages of the network through the filter including a security filter.

9. The system according to claim 7, wherein the identifying of the incorrectness bias of the data is at a lowest level of data ingestion into the edge server, and
wherein the corrective measures include flagging the data to adjust value of the data by remeasuring by a sensor that initially transmits the data to the edge server.

10. The system according to claim 9, wherein the flagging of the data includes when anomalous data patterns across transactions are detected.

11. The system according to claim 7, wherein the identifying further includes temporal simulation and correlation of the data received by the edge server to detect embedded data threats.

12. The system according to claim 7, wherein the incorrectness bias spread and the incorrectness bias with the filter including a security filter in the edge server and subsequent stages of the network are used to identify incorrectness of the data to validate data integrity.

13. A computer program product comprising a computer readable storage medium having program instructions embodied therewith, the program instructions readable and executable by a computer to cause the computer to perform a method for providing edge data correctness and correctness spread determination, comprising:
identifying an incorrectness bias in data received at an edge server of a network
through a filter with filter rules,
wherein the incorrectness bias includes spatial impurities in the data, and
wherein spatial impurities include anomalous data that does not follow a pattern of other data in the data received,
detecting, based on the incorrectness bias, anomalous data patterns, wherein the detected pattern indicates an identity spoofing issue;
simulating vulnerability data assessments for the spatial impurities;
identifying, based on the simulation, disguised data anomalies related to the spatial impurities from the incorrectness bias;
performing corrective measures to the data according to the disguised data anomalies that are identified;
learning and automatically updating the filter rules of the filter based on an extent of the incorrectness bias of the data and spread of the incorrectness bias of the data to reduce latency in future data validation of the data; and
creating security filter rules configured to mitigate incorrectness spread and incorrectness bias, wherein the security filter rules are varied across application and usage classes, and wherein a learning method provides a variance for the security filter rules.

14. The computer program product according to claim 13, wherein the identifying of the incorrectness bias in the data received is identified at the edge server and subsequent stages of the network through the filter including a security filter.

15. The computer program product according to claim 13, wherein the identifying of the incorrectness bias of the data is at a lowest level of data ingestion into the edge server, and
wherein the corrective measures include flagging the data to adjust value of the data by remeasuring by a sensor that initially transmits the data to the edge server.

16. The computer program product according to claim 13, wherein flagging of the data includes when anomalous data patterns across transactions are detected.

17. The computer program product according to claim 13, wherein the identifying further includes temporal simulation and correlation of the data received by the edge server to detect embedded data threats.

18. The computer program product according to claim 13, wherein the incorrectness bias spread and the incorrectness bias with the filter including a security filter in the edge server and subsequent stages of the network are used to identify incorrectness of the data to validate data integrity.

* * * * *